United States Patent [19]
Gonthier

[11] Patent Number: 5,883,992
[45] Date of Patent: Mar. 16, 1999

[54] METHOD FOR MAKING OPTICAL WAVEGUIDE COUPLERS WITH LOW WAVELENGTH SENSITIVITY AND COUPLERS THEREBY PRODUCED

[75] Inventor: Francois Gonthier, Montreal, Canada

[73] Assignee: Framatome Connectors Canada Inc., Scarborough, Canada

[21] Appl. No.: 737,540

[22] PCT Filed: May 12, 1995

[86] PCT No.: PCT/CA95/00283

§ 371 Date: Nov. 14, 1996

§ 102(e) Date: Nov. 14, 1996

[87] PCT Pub. No.: WO95/31742

PCT Pub. Date: Nov. 23, 1995

[30] Foreign Application Priority Data

May 17, 1994 [CA] Canada ................................. 2123757

[51] Int. Cl.$^6$ .......................................................... G02B 6/28
[52] U.S. Cl. .................................................................. 385/43
[58] Field of Search ............................... 385/43, 46, 96, 385/99

[56] References Cited

U.S. PATENT DOCUMENTS

| | | | |
|---|---|---|---|
| 4,765,816 | 8/1988 | Bjornlie et al. | 65/4.2 |
| 5,054,874 | 10/1991 | Hill et al. | 385/43 |
| 5,058,979 | 10/1991 | Yamauchi et al. | 385/43 |
| 5,175,779 | 12/1992 | Mortimore | 385/43 |
| 5,644,666 | 7/1997 | Campbell et al. | 385/43 |
| 5,671,309 | 9/1997 | Abe et al. | 385/43 |

FOREIGN PATENT DOCUMENTS

| | | |
|---|---|---|
| 0171479 | 2/1986 | European Pat. Off. . |
| 0418872 | 3/1991 | European Pat. Off. . |
| 0525743 | 2/1993 | European Pat. Off. . |
| 4258905 | 9/1992 | Japan . |
| 9008968 | 8/1990 | WIPO . |
| 9211552 | 7/1992 | WIPO . |

Primary Examiner—Hemang Sanghavi
Attorney, Agent, or Firm—Ware, Fressola, Van Der Sluys & Adolphson, LLP

[57] ABSTRACT

A method is provided for making an optical waveguide coupler with low wavelength sensitivity, such as an optical fiber coupler, which comprises forming a tapered coupler from an array of waveguides or a bundle of individual optical fibers, the tapering being done so as to produce an asymmetric longitudinal profile such as to flatten the wavelength response in the coupler and thereby reduce its wavelength sensitivity within a predetermined wavelength range. An optical waveguide coupler with low wavelength sensitivity is also included within the scope of this invention. Wavelength insensitive couplers of 2×2 and 2×N configuration, are of particular interest.

27 Claims, 5 Drawing Sheets

METHOD FOR MAKING OPTICAL WAVEGUIDE COUPLERS WITH LOW WAVELENGTH SENSITIVITY AND COUPLERS THEREBY PRODUCED

BACKGROUND OF THE INVENTION

1. Field of the Invention

The present invention relates to optical waveguide couplers, such as optical fiber couplers, with low wavelength sensitivity, as well as to the method of their manufacture. The invention is particularly concerned with wavelength insensitive single-mode fiber couplers.

2. Brief Description of the Prior Art

Single-mode optical fibers form the backbone of optical communication networks. Such networks need passive components, such as power dividers, to distribute optical signals to different routes. To benefit from the large bandwidth of the fiber, several wavelengths are used to send the optical signals. The star couplers, used as 1 to N power splitters, have to be wavelength insensitive for the system to benefit from the full bandwidth of the optical fibers. The two main windows of operation for telecommunications systems are around the wavelengths of 1.3 $\mu$m and 1.55 $\mu$m. Typically, the window widths are considered to be approximately 80 to 100 nm wide around those wavelengths. A coupler operating in those windows is called a dual window coupler, while a coupler operating from about 1.2 $\mu$m to 1.6 $\mu$m is called wavelength insensitive coupler.

Several solutions have been proposed. to build dual window and wavelength insensitive couplers. The smallest split number for a coupler is two. Dual window 2×2 all-fiber couplers are made either by using an asymmetrical coupler or a Mach-Zehnder structure. Wavelength insensitive 1×2 splitters can also be made with a Y junction in integrated optics. Once there is the basic 1×2 or 2×2 structure, one can make a large port number star coupler 1×2M (1×4, 1×8, 1×16, 1×32, etc.) by concatenation. With integrated optics, these concatenated star splitters can be made on a single chip. In fused fiber technology, dual window 1×3, 1×4, . . . , 1×7 can be produced.

One of the ways of making a 1×N coupler where N<8, is to place N-1 fibers symmetrically around a central fiber in which the power is injected at the beginning of or entry to the coupler. The simple model of placing N cores in a single cladding and calculating coupled mode equations to determine power transfer between the guides shows the possibility of fabricating 1×N couplers. The power launch in the central core, at the beginning of the coupler, couples to the outer cores in an equally distributed fashion because of symmetry. If the coupling parameters are right, there comes a point along the coupler where the power is equally distributed in all the cores, creating a 1×N coupler at a given wavelength. Since coupling is an oscillatory process, if the coupler is longer, there will be a second cross point between the power in the central and outer cores, making it possible to operate the device at two wavelengths. Using this type of geometry, Mortimore, for example in U.S. Pat. No. 5,175,779 dated Dec. 29, 1992 has shown that by controlling the fusion between the fibers, one could realize a dual window 1×N coupler.

One problem with this design, which is similar to that of the asymmetric 2×2 coupler, is that the bandwidth is limited by the oscillatory aspect of the transmission as a function of wavelength, the transmission of the central fiber having the greatest variation. A good control of the fabrication parameters is required to first make the equipartition cross points in the transmission at the correct wavelengths, by controlling the maximum exchange power and the wavelength period, and, second, to minimize the wavelength sensitivity, which according to the theory provided by Mortimore, can never be completely suppressed.

International PCT Application WO 90/08968 discloses a wide band single-mode fiber optic coupler in which at least two fibers are joined in a fused and tapered coupling region wherein the taper is asymmetrical in the longitudinal extent about the mid point of the geometric centre of the fused coupling region with the difference in the fiber diameters in that region changing at a varying rate along the length of the region. The method for making such coupler requires pre-tapering at least one of the fibers and then bringing the fibers into side-by-side contact with the points of such contact having different local geometries, and then heating and elongating such fibers. This particular invention therefore requires pre-tapered fibers and is based on providing a fused coupling region where the difference in the fiber diameters changes at a varying rate along the length of the region.

Although the above PCT Application mentions "at least two" fibers, all its data and examples relate to a coupler made of only two fibers of different diameters which are combined, heated and drawn so as to have the difference in the fiber diameters in the coupling region changing at a varying rate. This is stated to produce the desired wide band property in the coupler. It is not explained how this could be achieved, for example, in a 1×N fused couplers which are made of N-1 fibers surrounding a central fiber. Certainly, when N is for example 6 or 8, the difficulty of pre-tapering the fibers and properly positioning them to achieve the varying rate in diameter would be extremely difficult.

Also, Japanese Patent Abstract of JP-A-91-41308 discloses a possibility of producing a wide band optical fiber coupler by fusing and stretching two optical fibers having asymmetrically tapered stretched parts. To produce the asymmetric tapering the two fibers are simultaneously heated and stretched so that the tapering is asymmetrical in each fiber; then the direction of one of the fibers is changed backward so as to achieve a difference in the asymmetry between the fibers in the tapered region. Then the fibers are twisted in the region and finally heated and simultaneously re-stretched at an equal speed to produce the desired coupler. This again requires a difference in optimum optical (maximum bandwidth) and environmental performances.

Other objects and advantages of this invention will be apparent from the following more detailed description thereof.

The approach involves fabricating the coupler with an asymmetric longitudinal taper profile or twist which causes asymmetric coupler mode coupling that decreases wavelength dependence.

Fused fiber couplers are modal interferometers, i.e., they are devices with structures where optical waveguide modes beat and interfere. In couplers, this mode beating produces an exchange of power between the output waveguides. To differentiate them from single-mode waveguide modes, the coupler modes are often called supermodes.

This invention includes optical couplers in which two supermodes are involved. These couplers have a sinusoidal response as a function of coupler parameters, including wavelength of operation. There are two types of couplers in this category. First, 2×2 couplers where the first symmetric and first antisymmetric modes, noted $LP_{01}$ and $LP_{11}$, are excited. All-fiber 2×2 couplers are made by laterally fusing two optical fibers. Second, couplers with the structure composed of a central fiber surrounded by N outer fibers, which involves the beating of only the first two symmetric coupler modes, i.e., the fundamental mode and the second mode noted $LP_{01}$ and $LP_{02}$ respectively.

In a fused tapered coupler, the tapering reduces the fiber core size which, in turn, reduces the core's light guiding properties. The fundamental mode thus escapes the core exciting cladding modes of the appropriate symmetry, either $LP_{01}$ and $LP_{11}$ for the 2×2 coupler or $LP_{01}$ and $LP_{02}$ for the 1×N couplers. In the latter case, these are the only modes excited if the input power is launched only in the central fiber. The beating between these modes produces the exchange of power from the central to the outer fibers.

These two-supermode couplers have a sinusoidally configured wavelength response, namely the power in the main input fiber oscillates sinusoidally. For symmetric 2×2 couplers, i.e., couplers made with two identical fibers or waveguides, this oscillation has an amplitude of 1. The transmission $P_1$ in the main fiber, i.e. the fiber into which the input light is injected, can be represented by the following equation:

$$P_1 = \cos^2(\alpha) \tag{1}$$

where $\alpha$ is half the accumulated phase difference between the supermodes. The power in the second branch is complementary to $P_1$.

The coupler with a 50% coupling ratio has thus the greatest wavelength dependency. It is well known in the art that fusing fibers of different sizes flattens the wavelength response of a 50/50 coupler, because it reduces the amount of coupling between the guides, making the 50% coupling ratio points closer to the extremum of the oscillatory wavelength response. This effect makes it also possible to fabricate a better dual-window coupler. The reduction for the maximum coupled power can be modeled by taking into account coupling between the supermodes. This coupling occurs because the coupler has a longitudinal structure which varies in dimension and because the coupler is not transversally symmetric. In a fused coupler this varying structure is a direct result of the elongation which produces a biconical tapered structure. This type of coupling does not occur in a transversally symmetric 2×2 coupling because the two supermodes are always orthogonal to each other, irrespective of the coupler diameter. With the understanding that this coupling between the supermodes occurs where the profile slopes are greatest, i.e., at the extremities of the coupler, in the region where the taper slopes are larger, the transmission $P_1$ can thus be written, for longitudinally symmetric profile, as follows:

$$P_1 = \cos^2(\alpha) + \sin^2(2\kappa)\sin^2(\alpha) \tag{2}$$

where $\kappa$ is a parameter related to the supermode coupling at the two ends of the coupler. One can directly see from Equation 2 that the supermode coupling is responsible for the second term of the expression which, if it is not zero, will limit the power transfer.

One of the main observations of this invention is that this type of supermode coupling occurs also in 1×N fused couplers made of N-1 fibers surrounding a central fiber. Unlike the 2×2 couplers, 1×N couplers involves modes of the same transverse symmetry, $LP_{01}$ and $LP_{02}$.

If the slopes are small enough, the two modes $LP_{01}$ and $LP_{02}$, excited at the beginning of the coupler, will propagate without coupling to each other and the maximum power exchange will depend only on the number of fibers, their size and relative positions. If the slopes are very large, both modes will couple to higher order and radiation modes and the coupler will be lossy. If the taper slopes are not too large, however, the two coupler modes will couple to and exchange power with each other in the large slope section at the beginning and end of the coupler without coupling in a significant fashion to higher order and radiation modes. In the central region where the slopes are small, the two coupler modes will beat as before. This effect is similar to what is observed in abruptly tapered fibers. The transmission in the main branch of 1×N couplers can thus be written in the form of Equation 2. For the 1×N coupler, all the power which is not in the central fiber is equally distributed in the outer fibers if the coupler preserves its transverse symmetry all along its length.

The second main observation of this invention is that if the supermode coupling is not symmetric, i.e., the coupling parameter is $\kappa_1$ at the beginning of the coupler and $\kappa_2$ at the end of the coupler, the transmission $P_1$ in the main fiber can be written according to the following equation:

$$P_1 = \cos^2(\kappa_1 - \kappa_2)\cos^2(\alpha) + \sin^2(\kappa_1 + \kappa_2)\sin^2(\alpha) \tag{3}$$

This equation is valid for 2×2 transversally asymmetric couplers and 1×N couplers composed of a single fiber surrounded by N-1 outer fibers if both types of couplers have an asymmetric longitudinal profile, as well as for waveguide couplers generally. From Equation 3, it is clear that the supermode coupling does not affect only the minimum, but can reduce the maximum and thus flatten the wavelength response even more. By choosing the coupling correctly, it is possible to set the contrast to a minimum and the variation to be centred on the equipartition of power between the fibers making the coupler wavelength insensitive.

It is well known that the mode coupling due to tapering can be controlled by the profile slopes. For 1×N couplers made of N-1 fibers surrounding a central fiber, it is also possible to control this coupling by twisting around the central fiber axis. Furthermore, these effects affect each other. Twisting a coupler with an asymmetric taper profile will cause differential twisting and thus different coupling effects in the down and up taper.

Thus, a method of producing a wavelength insensitive coupler is to make a 1×N coupler, composed of N-1 fibers surrounding a central fiber, and finding the correct asymmetric longitudinal taper profile and amount of twist which will create a wavelength response with a low sensitivity.

The fabrication of such coupler may be achieved as follows:

The optical fibers are aligned in an appropriate geometry using special fiber holders which can rotate around the axis of the coupler and which are mounted on a standard coupler fabrication jig on which the torch position and the pulling motors are computer controlled. When placed in the holders, the fibers are initially parallel, but well separated. They are stripped of their protective jacket over a predetermined length and cleaned. After equal tension in the fibers is established, they are then twisted together by rotating the fiber holders. The fibers must be in contact with each other in the appropriate geometry over a predetermined length. The fibers are then bound together at the extremities of the uncoated region and held on those points by means of clamps. The computer controlled fusion and elongation of the coupler is then realized. This fabrication method is designed to achieve an asymmetrical longitudinal taper profile, by varying the torch position, the pulling speed of the travel stage on which the fiber holders are mounted and/or blocking partially and temporarily the flame over a given area. The optical power transmission of all output ports on the coupler is monitored at 1.55 μm during the fabrication and the elongation is stopped after the transmitted power of the coupler has gone through half a cycle. The flame is removed and the coupling ratios at 1.55 μm and 1.3 μm are, if required, further adjusted by twisting the newly formed coupler. The coupler is then fixed on the appropriate substrate and packaged. If the longitudinal profile is right, the coupler will show little wavelength sensitivity.

In essence, therefore, the method of the present invention for making an optical fiber coupler with low wavelength sensitivity comprises: forming an array of optical fibers of constant diameter, wherein a main optical fiber is used to transmit light to other optical fiber or fibers of the coupler, said other optical fiber or fibers being identical and symmetrically positioned with respect to the main optical fiber; and fusing and tapering said array of optical fibers so as to produce a longitudinally asymmetric taper profile without variation of the optical fiber diameters relative to one another, said profile being such as to flatten wavelength response in the coupler and thereby reduce the wavelength sensitivity of coupling within a predetermined wavelength range. In a more specific embodiment the novel method comprises: forming an array of more than two identical, symmetrically positioned optical fibers of constant diameter, wherein a main optical fiber is used to transmit light to other optical fibers of the coupler; and fusing and tapering said array of optical fibers so as to produce a longitudinally asymmetric profile, such as to flatten wavelength response in the coupler and thereby reduce the wavelength sensitivity of coupling within a predetermined wavelength range. Preferably the tapering is effected so that the light transmission $P_1$ in the main fiber is according to the following equation:

$$P_1 = \cos^2(\kappa_1 - \kappa_2)\cos^2(\alpha) + \sin^2(\kappa_1 + \kappa_2)\sin^2(\alpha)$$

wherein $\kappa_1$ is a coupling supermode parameter at the entry region of the coupler and $\kappa_2$ is a coupling supermode parameter at the exit region of the coupler, and $\alpha$ is the accumulated phase difference between the two supermodes.

The tapered optical fibers suitable for the purposes of the present invention are particularly single-mode optical fibers. The method of making an optical fiber coupler with low wavelength sensitivity in accordance with the present invention essentially comprises forming a fused, tapered coupler from an array or bundle of individual optical fibers having a predetermined cross-sectional arrangement, the tapering being done so as to produce an asymmetric longitudinal taper profile such as to flatten wavelength response in the coupler and thereby reduce the wavelength sensitivity of coupling within a predetermined wavelength range. No pre-tapering of the individual optical fibers is performed in accordance to the present invention.

The bundle of individual fibers may be twisted prior to, during and/or after forming the fused, tapered coupler.

The method is particularly suitable to make 2×2 transversely asymmetric couplers, namely where two optical fibers of different type or size are used to form the coupler, and 1×N single-mode couplers with an asymmetric longitudinal taper profile where N is greater than 1.

In the manufacture of 1×N wavelength insensitive couplers made of N-1 fibers surrounding a central fiber and symmetrically positioned around said central fiber, where N is greater than 1, the method preferably comprises the following steps:

(a) stripping the fibers of their protective jacket in the coupling region;
(b) twisting the stripped fibers together while preserving their spatial arrangement and fixing them in such twisted condition;
(c) heating the twisted fibers and pulling the same so as to fuse and elongate them in the coupling region and to produce an asymmetric longitudinal taper profile which will reduce the wavelength sensitivity of the resulting coupler within a predetermined wavelength range; and
(d) once the asymmetric longitudinal taper profile is obtained, packaging the coupler by fixing it on a substrate and placing the same in a suitable protective enclosure.

After stripping, the fibers are usually cleaned with a suitable solvent and at least some of the fibers may be etched to reduce their diameter. Then, they are twisted with the help of rotatable holders which hold the fibers in a predetermined spatial arrangement. After twisting, the fibers are fixed in the twisted condition by bonding them at each end of the coupling region.

The heating of the fibers can be effected with a suitable heat source, such as a flame, for example from a microtorch, which is moved back and forth along the coupling region, so that the glass softens but does not melt, and the fibers are simultaneously pulled to achieve the desired fusing and tapering of the coupler.

The asymmetric longitudinal taper profile required in accordance with the present invention can be achieved by heating the fibers asymmetrically, such as varying the speed, position, distance from the fibers and/or temperature of the heat source along the coupling region. For example, this can be done by blocking the flame at one end of its sweep range in a suitable manner or by pulling the fibers from the two sides at different speeds. Additional twisting of the fibers in a predetermined manner during the heating and pulling thereof can enhance wavelength insensitivity. Finally, if required, the coupler can be fine-tuned to achieve the desired wavelength flattening within a predetermined wavelength range (if it has not been achieved by fusing and pulling the fibers) by subjecting the coupler to a further twist after the coupler has been formed, while monitoring the cycling ratio until the desired value is obtained, and then fixing the coupler in this condition onto the substrate, preferably by bonding it to the substrate so as to achieve mechanical integrity outside of the tapered region.

In couplers made of a bundle of individual optical fibers composed of a central single-mode fiber surrounded by N-1 single-mode fibers, the central fiber can have a larger diameter than the surrounding fibers in order to produce couplers such as 1×8 and beyond. This is often accomplished by reducing the diameter of the surrounding fibers by etching the same.

BRIEF DESCRIPTION OF THE DRAWINGS

The invention will further be described with reference to the accompanying drawings in which.

DESCRIPTION OF THE PREFERRED EMBODIMENT

Figure 1:
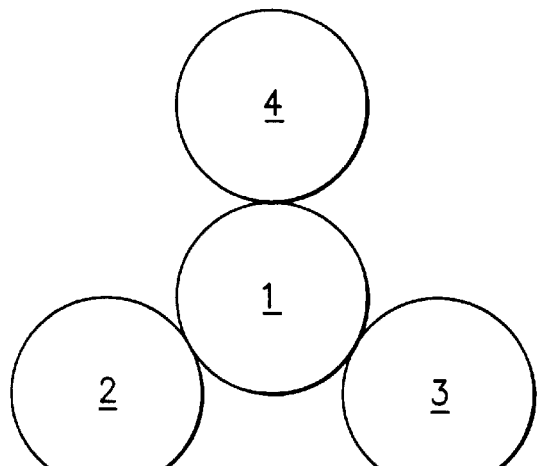
FIG. 1 is a cross-section of a spatial arrangement of the 4 optical fibers in a 1×4 coupler used to illustrate the preferred embodiment of the present invention.

The preferred embodiment of this invention will be described with reference to the drawings in which the same reference numbers are used to describe the same parts in all figures. This preferred embodiment describes the fabrication of a 1×4 star coupler made of three fibers surrounding a central fiber, all fibers being identical. This is illustrated in FIG. 1 where the central fiber 1, which, in this case, is the main waveguide, is surrounded by three outer fibers 2, 3 and 4 centred on the apexes of an equilateral triangle. Such 1×4 wavelength insensitive couplers are made with standard single-mode matched cladding fibers used for telecommunications systems operating at wavelengths between 1.2 $\mu$m and 1.6 $\mu$m.

Figure 2:
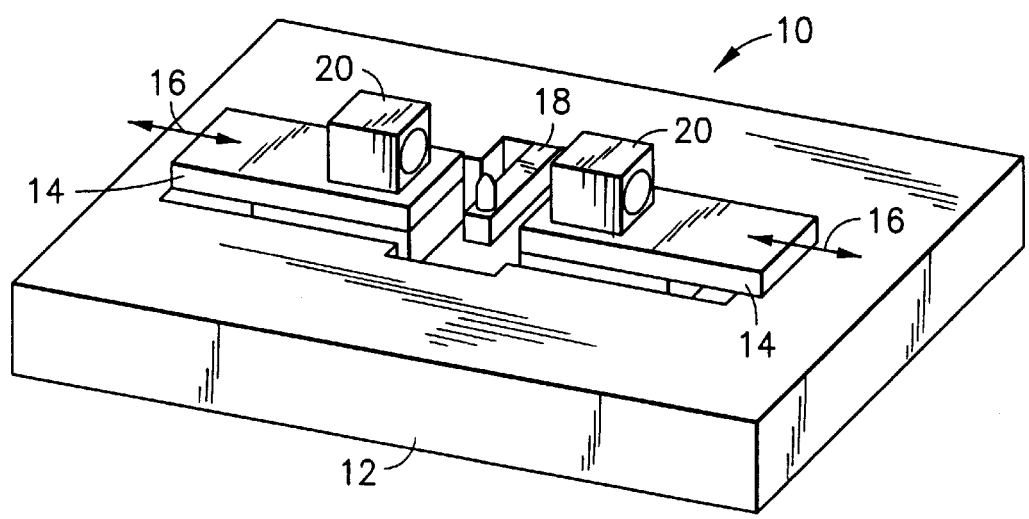
FIG. 2 is an illustration representing the basic platform in a fused fiber coupler production jig suitable for the purposes of the present invention.

The fabrication jig used for the manufacture of the couplers in accordance with the present invention can be a standard computer controlled jig modified only by the provision of special fiber holders on the basic platform on which the coupler is made. This platform 10 is illustrated in FIG. 2. It has a base 12 on which are mounted two travelling stages 14 which move along the same axis illustrated by arrows 16. A microtorch 18 on X-Y-Z positioners is provided between the two travelling stages 14 and is movable along the three axes. The motors of the travelling stages and of the torch as well as the gas flow controllers for the torch are computer controlled in a known manner.

Figure 3:
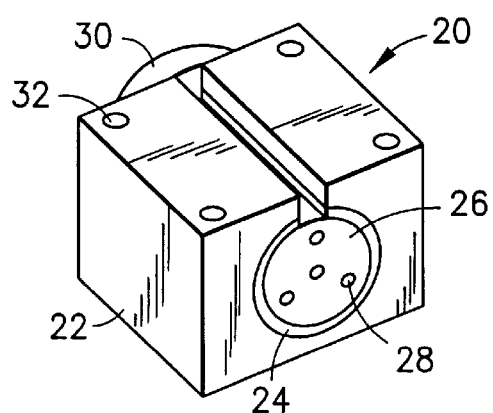
FIG. 3 is a view in perspective of one of the fiber holders with a section which can rotate around the coupler central axis, which can be used pursuant to this invention.

The special fiber holders 20 added to achieve the coupler profile of the present invention are fixed to travelling stages 14 which are used to pull axially on the fibers when they are heated by torch 18. One such fiber holder 20 is illustrated in greater detail in FIG. 3. It comprises a mounting block 22 with a cylindrical opening 24 in which a rotatable fiber support 26 is located. This support is provided with longitudinal holes 28 through which the fibers pass in a predetermined spatial arrangement. Fiber support 26 can be rotated by handle 30. The mounting block 22 can be fixed to stage 14 by screws passing through screw holes 32.

Figure 4:
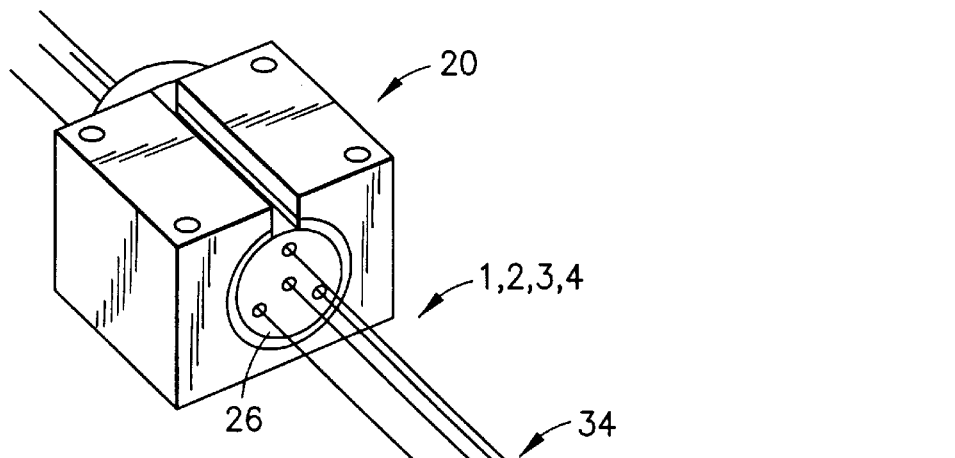
FIG. 4 shows an arrangement of the fibers passing through two fiber holders, such as shown in FIG. 3, where the fibers are parallel to each other.
Figure 5:
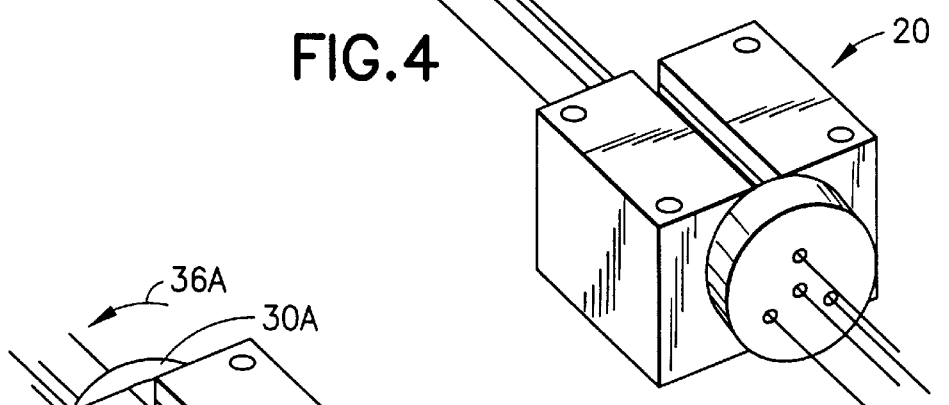
FIG. 5 shows an arrangement of the fibers similar to FIG. 4, but after being twisted and bonded together in the central region.
Figure 6:
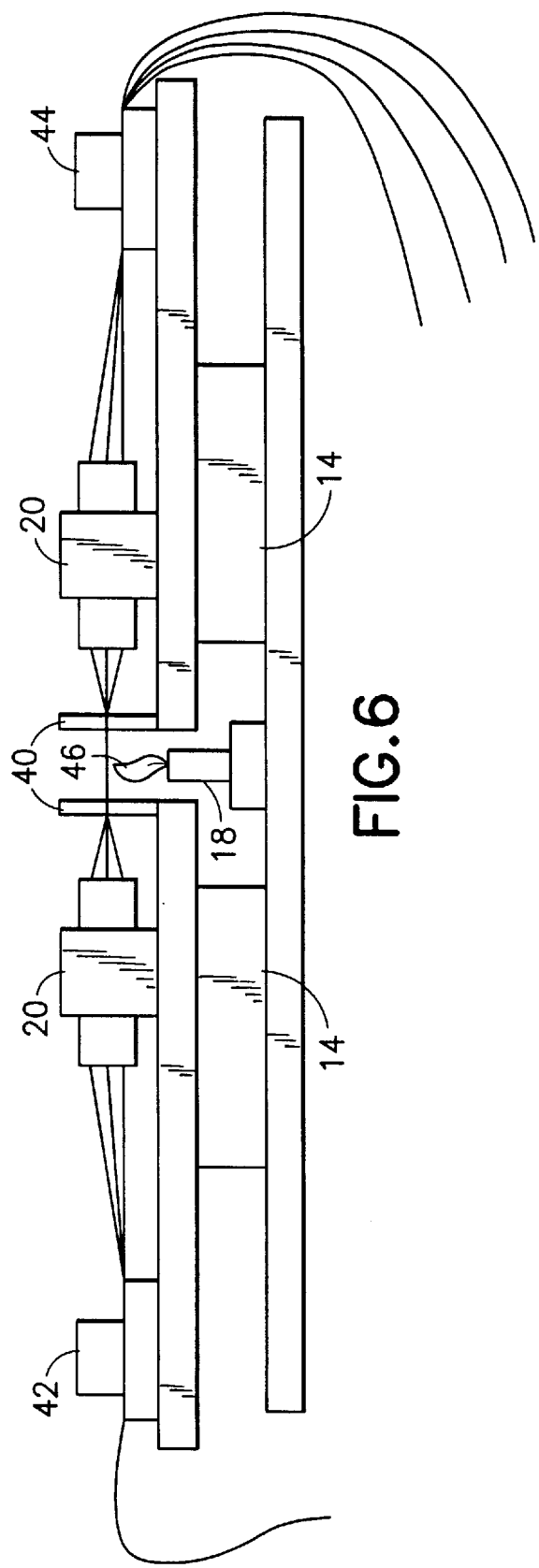
FIG. 6 is a side view representation of the fabrication jig with the fiber setup and all the clamps in place to hold the fibers before fusion and elongation.

The fibers are initially mounted in a spatial arrangement as illustrated in FIG. 4. In the present embodiment, the four fibers 1, 2, 3, 4 are inserted in the appropriate holes of the rotatable fiber support 26 in each fiber holder 20, passing through these supports so as to be parallel to each other and well separated. In the middle portion 34 the fibers are stripped of their protective jacket and cleaned. Normally the central fiber is uncovered over a shorter region than the outer fibers. The fibers are then taped to a mounting support on the input side and small weights are attached individually to the output fibers to provide uniform tension. Then, as shown in FIG. 5, the fibers are twisted together in the region 34. This is done with the help of handles 30A and 30B each of which providing half a twist on each side as shown by arrows 36A and 36B. This twisting brings all the fibers together, but preserves their spatial arrangement. The fibers are then bonded together at the jacket edges 38; this is usually done using a UV curable glue, although other suitable bonding techniques can also be used. Special clamps 40 are normally provided to hold the fibers at these points 38 where they are bonded together; these are illustrated in FIG. 6 which shows the final setup used for fusion and elongation. As shown in this FIG. 6, fiber clamps 42 and 44 are provided at each end to hold the fibers at the input end and the output end respectively while fusing and elongation takes place. In order to effect fusion, flame 46 is lighted and positioned to heat the fibers. In this particular embodiment, the flame is about 5 mm wide and is positioned about 1 cm below the fiber so that the glass softens, but does not melt. The coupler is then pulled at 50 $\mu$m/s using pulling stages 14. During this operation the flame is moved slowly back and forth along the coupler over a distance of about 1 cm to insure a smoother profile. To produce an asymmetric profile, which is schematized in FIG. 7, one can either block partially and temporarily the flame at one end of the sweep range for one pass, or pull on the two sides at different speeds. The fused structure is thus pulled creating the asymmetry. The coupler coupling ratio is then being monitored at 1.55 $\mu$m. At a given point in the elongation, coupling will occur and the transmission in the central fiber will decrease and the coupled power will cause the transmission in the three outer fibers to increase. At one point in the elongation the central fiber transmission reaches a minimum and starts to come up again. The pulling is stopped when the transmission is above 25%. It is important to verify that the transmission at 1.3 $\mu$m is slightly greater than at 1.55 $\mu$m because the tuning process, if it is required, will affect 1,55 $\mu$m more than 1,3 $\mu$m. The tuning is not always required; if the asymmetry and twisting are right, the basic process will yield directly a wavelength insensitive coupler.

Figure 7:
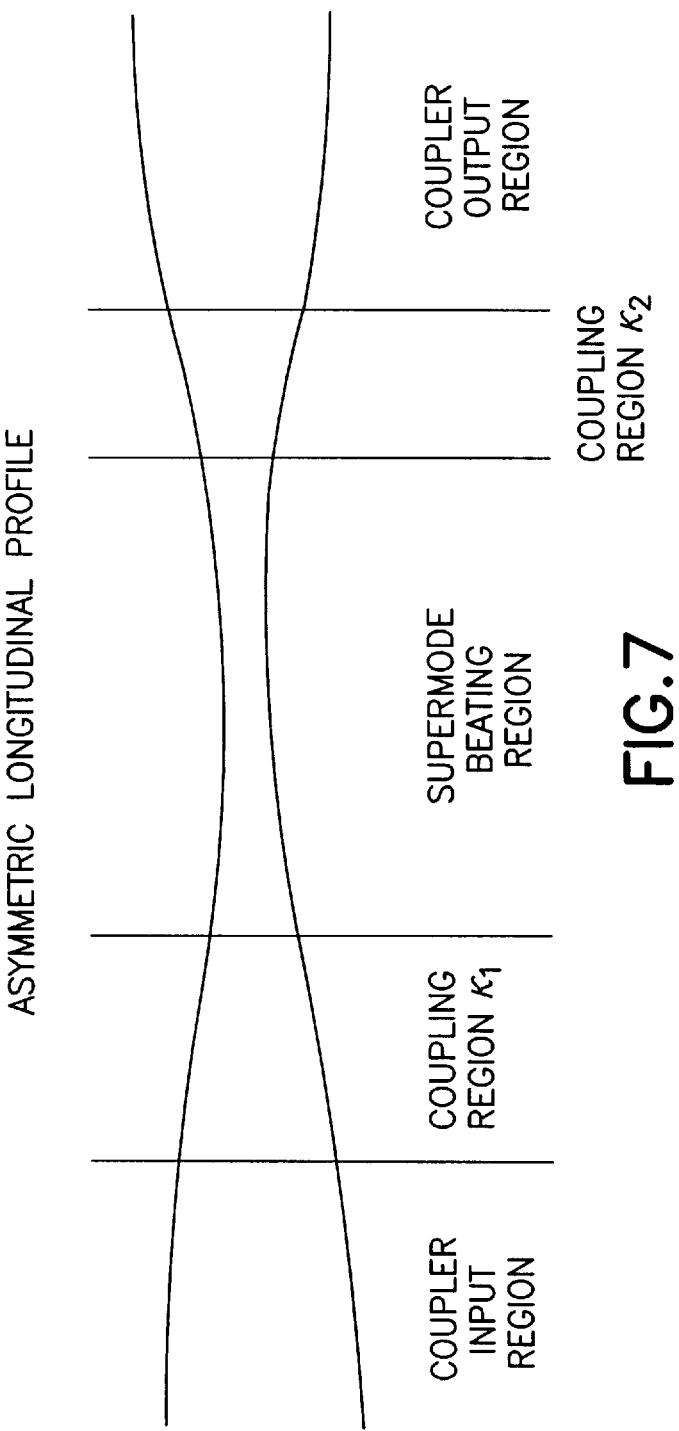
FIG. 7 is an illustration of an asymmetric longitudinal taper profile produced in accordance with the present invention wherein the different regions where coupling and beating are occurring with this kind of structure are shown.

It should also be pointed out that to monitor the coupling ratio of the coupler, the fabrication setup also includes a dual wavelength laser source (1.31 $\mu$m and 1.55 $\mu$m) and four detectors. The measured powers are also inputted in the computer which can be controlled to measure a predetermined wavelength. The four detectors are calibrated before proceeding with the manufacture of the coupler. If the detectors indicate that the desired asymmetric longitudinal profile has not been achieved by the basic fusion and elongation process, then the coupler can be fine tuned to obtain such profile. To tune the coupler, one must first remove the clamps holding the bound points 38; the fiber holder 20 at the output of the coupler is then rotated until the coupling ratios at both wavelengths are approximately equal. For the 1×4 coupler the tuning is stopped when the coupling ratio of all ports is (25±2)% at 1.31 $\mu$m and 1.55 $\mu$m. The asymmetric longitudinal taper profile such as shown in FIG. 7 is thereby achieved.

Figure 8:
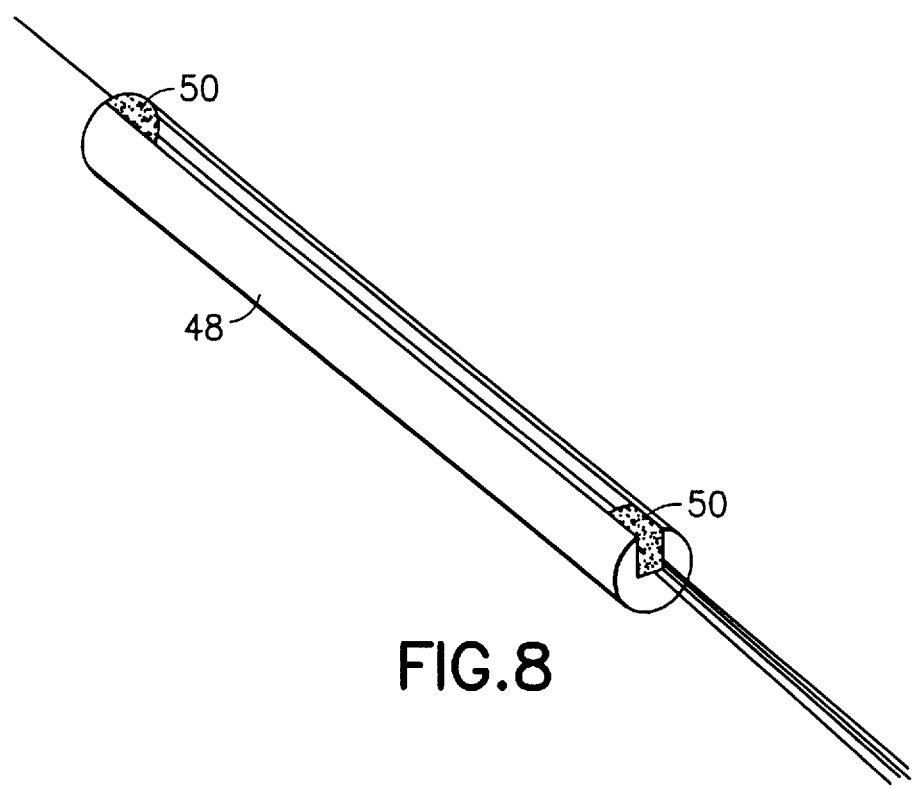
FIG. 8 is an illustration of the substrate and of the way the coupler is fixed on it.

The coupler is then fixed to a substrate 48 with a drop of glue 50 at each end as shown in FIG. 8. A typical substrate used in the packaging is a Pyrex™ rod 6.2 cm long by 3 mm in diameter which has a slot deep enough to accommodate the coupler. The substrate should normally match the thermal expansion coefficient of the optical fibers. The input outer fibers which are not used in a 1×4 configuration and which have been previously uncoated over a larger region than the central fiber are then cleaved just outside the glue spot. This substrate is packaged in a protective enclosure, for example by placing it inside a 4 mm inside diameter by 6.5 cm long steel tube the ends of which are then sealed.

Figure 9:
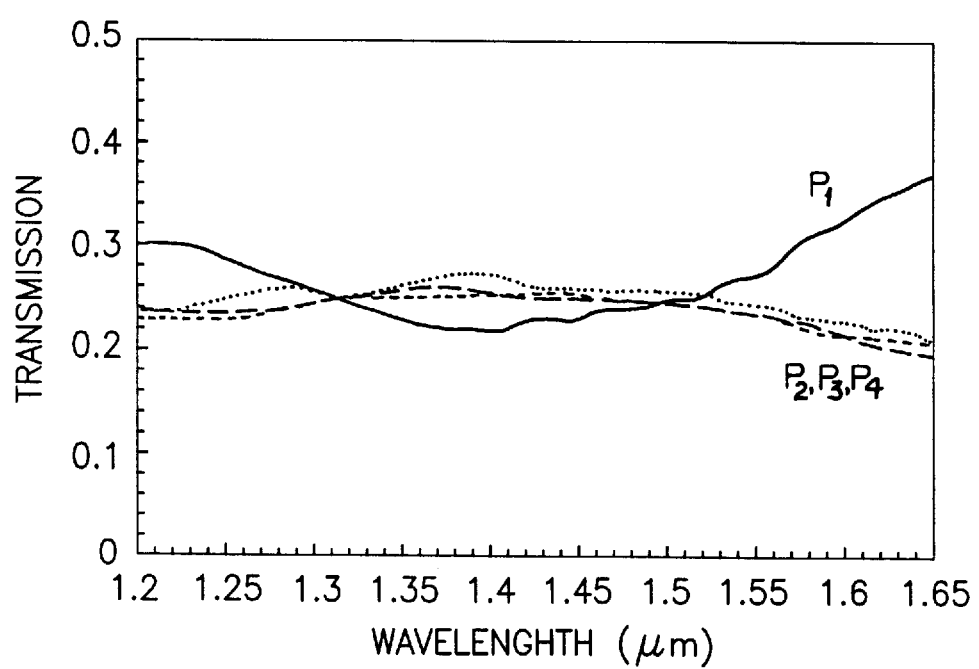
FIG. 9 is an experimental result showing the transmission in the 4 fibers of a 1×4 wavelength flattened coupler, such as shown in FIG. 1.

The spectral response of a tuned wavelength insensitive 1×4 coupler made in accordance with the above described embodiment of the present invention is shown in FIG. 9 which, in this example, provides a wavelength insensitive region of 1.3 μm to 1.55 μm.

It should, of course, be understood that the present invention is not limited to the above described preferred embodiment, but that many modifications evident to those skilled in the art can be made without departing from the spirit of the invention and the scope of the following claims. For example, the described technique can be applied to other 1×N couplers made of N-1 fibers surrounding a central fiber or to other optical fiber couplers such as 2×2 coupler and also to suitable optical waveguide couplers generally. Also it can be applied to other wavelength ranges where the coupler requires a wavelength insensitive region. For example, with a 0.85 μm single-mode fiber a flat response can be obtained over 0.8 μm to 1.2 μm region. The invention can be accomplished with various types of jigs and jig arrangements, provided only that required conditions be met to produce a coupler with the asymmetric longitudinal taper profile as described and claimed herein.

I claim:

1. A method of making an optical fiber coupler with low wavelength sensitivity, which comprises the steps of:

forming an array of optical fibers of constant diameter, by using a main optical fiber to transmit light to other optical fiber or fibers of the optical fiber coupler, said other optical fiber or fibers being identical and symmetrically positioned with respect to the main optical fiber; and fusing and tapering said array of optical fibers so as to produce a longitudinally asymmetric taper profile having an entry region with an entry region coupling supermode parameter, an exit region with an exit region coupling supermode parameter and an accumulated phase difference between the entry coupling supermode parameter and the exit region coupling supermode parameter, said longitudinally asymmetric taper profile providing transmission light that depends on the entry region coupling supermode parameter, the exit region coupling supermode parameter and the accumulated phase difference, and being such as to flatten wavelength response in the optical fiber coupler and thereby reduce the wavelength sensitivity of coupling within a predetermined wavelength range, wherein the method further comprises the step of:

tapering the optical fiber coupler so hat the light transmission is represented by $P_1$ in the main optical fiber proceeds according to the following equation:

$$P_1 = \cos^2(\kappa_1 - \kappa_2)\cos^2(\alpha) + \sin^2(\kappa_1 + \kappa_2)\sin^2(\alpha)$$

wherein $\kappa_1$ is the entry region coupling supermode parameter at the entry region of the optical fiber coupler, $\kappa_2$ is the exit region coupling supermode parameter at the exit region of the optical fiber coupler, and $\alpha$ is the accumulated phase difference between coupling supermode parameters at the entry region and the exit region of the optical fiber coupler.

2. A method according to claim 1, wherein the method further comprises the step of:

twisting the array of individual optical fibers prior to the steps of fusing and tapering.

3. A method according to claim 1, wherein the method further comprises the step of:

using two optical fibers of different type or size to form a 2×2 transversely asymmetric coupler with the longitudinally asymmetric taper profile.

4. A method according to claim 1, wherein the method further comprises the step of:

composing the array of individual optical fibers of a central single-mode fiber surrounded by N-1 single-mode fibers symmetrically positioned around the central single-mode fiber to form a 1×N single-mode coupler, where N is greater than 1.

5. A method according to claim 4, wherein the method further comprises the step of:

using the central single-mode fiber with a larger diameter than the N-1 single-mode fibers.

6. A method according to claim 5, wherein the method further comprises the step of:

etching each of the N-1 single-mode fibers to reduce a respective diameter thereof.

7. A method according to claim 1 for manufacturing 1×N wavelength insensitive couplers made of N-1 fibers surrounding a central fiber and symmetrically positioned around said central fiber, where N is greater than 1, which further comprises the steps of:

(a) stripping the N-1 fibers of their protective jacket in a coupling region;

(b) twisting N-1 stripped fibers together while preserving their spatial arrangement and fixing them in such twisted condition;

(c) heating and pulling N-1 twisted fibers so as to fuse and elongate them in the coupling region and to produce the longitudinally asymmetric taper profile which will reduce the wavelength sensitivity of a resulting coupler within the predetermined wavelength range; and (d) once the longitudinally asymmetric taper profile is obtained, packaging the optical fiber coupler by fixing it to a substrate and placing the same in a suitable protective enclosure.

8. A method according to claim 7, wherein the method further comprises the step of:

etching at least some of the N-1 fibers to reduce their diameter after stripping them of their protective jacket.

9. A method according to claim 7, wherein the method further comprises the steps of:

heating the N-1 fibers using a heat source which is moved back and forth along the coupling region, so that the glass softens but does not melt, and while so heated pulling the N-1 fibers to achieve the desired fusing and tapering of the coupler.

10. A method according to claim 9, wherein the method further comprises the step of:

using a flame as the heat source.

11. A method according to claim 9, wherein the method further comprises the step of:

heating the N-1 fibers asymmetrically to produce the longitudinally asymmetric taper profile.

12. A method according to claim 11, wherein the step of heating further comprises asymmetrically varying the speed, position, and distance from the N-1 fibers and/or temperature of the heat source along the coupling region.

13. A method according to claim 12, wherein the step of heating further comprises blocking the flame at one end of its sweep range.

14. A method according to claim 12, wherein the step of heating further comprises pulling the N-1 fibers from two sides at different speeds.

15. A method according to claim 7, wherein the method further comprises the step of:

additionally twisting the N-1 fibers in a predetermined manner during heating and pulling thereof to enhance wavelength insensitivity.

16. A method according to claim 7, wherein the method further comprises the steps of:
   tuning finely the optical fiber coupler to achieve the desired wavelength flattening within a predetermined wavelength range, by further twisting the optical fiber coupler after the optical fiber coupler has been formed while monitoring the coupling ratio until a desired value thereof is obtained, and
   then fixing the optical fiber coupler in this condition onto the substrate.

17. A method according to claim 16, wherein the method further comprises the step of:
   fixing the optical fiber coupler onto the substrate by bonding so as to achieve mechanical integrity outside a tapered region.

18. A method according to claim 17, wherein the method further comprises the step of:
   matching the substrate to the thermal expansion coefficient of the N-1 optical fibers.

19. A method of making an optical fiber coupler with low wavelength sensitivity, which comprises the steps of:
   forming an array of more than two identical, symmetrically positioned optical fibers of constant diameter, by using a main optical fiber to transmit light to other optical fibers of the optical fiber coupler;
   fusing and tapering said array of optical fibers so as to produce a longitudinally asymmetric profile having an entry region with an entry region coupling supermode parameter, an exit region with an exit region coupling supermode parameter and an accumulated phase difference between the entry coupling supermode parameter and the exit region coupling supermode parameter, such as to flatten wavelength response in the optical fiber coupler and thereby reduce the wavelength sensitivity of coupling within a predetermined wavelength range; and
   tapering the optical fiber coupler so that the light transmission is represented by $P_1$ in the main optical fiber proceeds according to the following equation:

$$P_1 = \cos^2(\kappa_1 - \kappa_2)\cos^2(\alpha) + \sin^2(\kappa_1 + \kappa_2)\sin^2(\alpha)$$

wherein $\kappa_1$ is the entry region coupling supermode parameter at the entry region of the optical fiber coupler, $\kappa_2$ is the exit region coupling supermode parameter at the exit region of the optical fiber coupler, and $\alpha$ is the accumulated phase difference between coupling supermode parameters at the entry region and the exit region of the optical fiber coupler.

20. An optical fiber coupler with low wavelength sensitivity, formed from an array of symmetrically positioned optical fibers of constant diameter, said optical fiber coupler having a fused and tapered coupling region with a longitudinally asymmetrical taper profile having an entry region with an entry region coupling supermode parameter, an exit region with an exit region coupling supermode parameter and an accumulated phase difference between the entry coupling supermode parameter and the exit region coupling supermode parameter,
   said profile longitudinally asymmetrical taper providing transmission light that depends on the entry region coupling supermode parameter, the exit region coupling supermode parameter and the accumulated phase difference that flattens wavelength response in the optical fiber coupler and thereby reduces the wavelength sensitivity of coupling within a predetermined wavelength range,
   wherein said profile longitudinally asymmetrical taper is formed so that the light transmission is represented by $P_1$ in the main optical fiber Droceeds according to the following equation:

$$P_1 = \cos^2(\kappa_1 - \kappa_2)\cos^2(\alpha) + \sin^2(\kappa_1 + \kappa_2)\sin^2(\alpha)$$

wherein $\kappa_1$ is the entry region coupling supermode parameter at the entry region of the optical fiber coupler, $\kappa_2$ is the exit region coupling supermode parameter at the exit region of the optical fiber coupler, and $\alpha$ is the accumulated phase difference between coupling supermode parameters at the entry region and the exit region of the optical fiber coupler.

21. An optical fiber coupler according to claim 20, wherein the fused and tapered coupling region has a twisted portion.

22. An optical fiber coupler according to claim 20, wherein at least some of the identical symmetrically positioned optical fibers are etched and thereby have a reduced diameter.

23. An optical fiber coupler according to claim 20, wherein the optical fiber coupler is a 2×2 transversely asymmetric coupler formed of two fibers of different type or size, and having the longitudinally asymmetric taper profile.

24. An optical fiber coupler according to claim 20,
   wherein the optical fiber coupler is a 1×N single-mode coupler, and
   wherein N-1 single-mode fibers are symmetrically disposed around a single central single-mode fiber, where N is greater than 1.

25. An optical fiber coupler according to claim 24, wherein the single central single-mode fiber has a greater diameter than the N-1 single-mode fibers which are identical.

26. An optical fiber coupler according to claim 20, wherein the optical fiber coupler is wavelength insensitive in a region of 1.2 $\mu$m to 1.6 $\mu$m.

27. An optical fiber coupler with low wavelength sensitivity, comprising:
   an array of more than two identical symmetrically positioned optical fibers of constant diameter; and
   a fused and tapered coupling region having a longitudinally asymmetric taper profile having an entry region with an entry region coupling supermode parameter, an exit region with an exit region coupling supermode parameter and an accumulated phase difference between the entry coupling supermode parameter and the exit region coupling supermode parameter which flattens wavelength response in the optical fiber coupler and thereby reduces the wavelength sensitivity of coupling within a predetermined wavelength range,
   wherein said fused and tapered coupling region is formed so that the light transmission is represented by $P_1$ in the main optical fiber proceeds according to the following equation:

$$P_1 = \cos^2(\kappa_1 - \kappa_2)\cos^2(\alpha) + \sin^2(\kappa_1 + \kappa_2)\sin^2(\alpha)$$

wherein $\kappa_1$ is the entry region coupling supermode parameter at the entry region of the optical fiber coupler, $\kappa_2$ is the exit region coupling supermode parameter at the exit region of the optical fiber coupler, and $\alpha$ is the accumulated phase difference between coupling supermode parameters at the entry region and the exit region of the optical fiber coupler.

* * * * *

UNITED STATES PATENT AND TRADEMARK OFFICE
CERTIFICATE OF CORRECTION

PATENT NO : 5,883,992
DATED : March 16, 1999
INVENTOR(S) : François Gonthier

It is certified that error appears in the above-identified patent and that said Letters Patent is hereby corrected as shown below:

In column 9, line 48, please delete "hat" and insert --that--.

In column 12, line 3, please delete "Droceeds" and insert --proceeds--.

Signed and Sealed this

Seventh Day of September, 1999

Q. TODD DICKINSON

Attest:

Attesting Officer

Acting Commissioner of Patents and Trademarks